Jan. 31, 1956     R. L. DALTON ET AL     2,733,205

PROCESS FOR ABSTRACTING ANIONS FROM ALUMINA SOL

Filed Nov. 30, 1951

INVENTORS:
GUY B. ALEXANDER,
RICHARD L. DALTON
and RALPH K. ILER

BY

ATTORNEYS.

2,733,205
PROCESS FOR ABSTRACTING ANIONS FROM ALUMINA SOL

Richard L. Dalton, Ralph K. Iler, and Guy B. Alexander, Wilmington, Del., assignors to E. I. du Pont de Nemours & Company, Wilmington, Del., a corporation of Delaware Application November 30, 1951, Serial No. 259,022

1 Claim. (Cl. 210—24)

This invention relates to processes for abstracting anions from aqueous alumina sols and is more particularly directed to such processes wherein there is used an anion-exchanger in bicarbonate form. The invention is further directed to the products produced.

Figure 1:
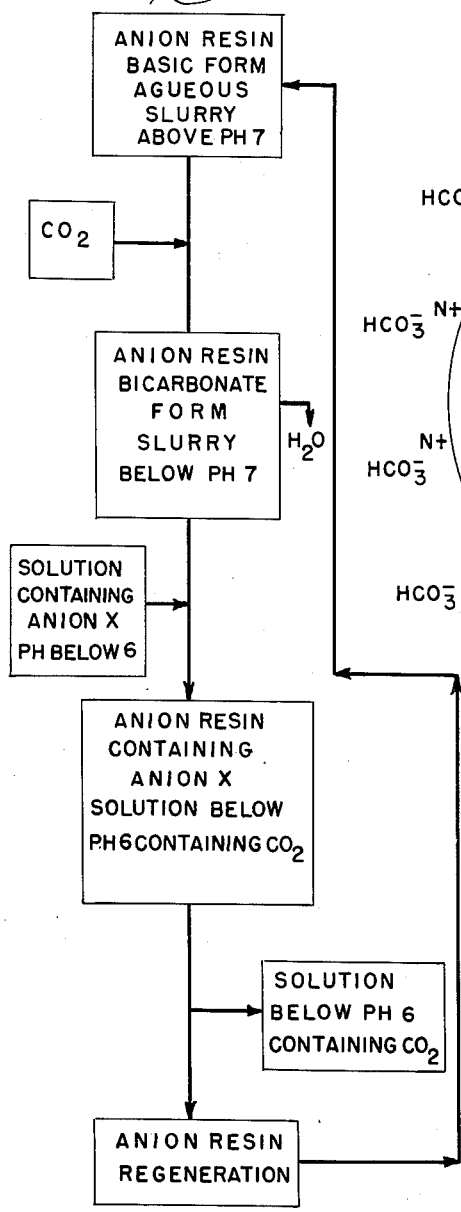
Figure 2:
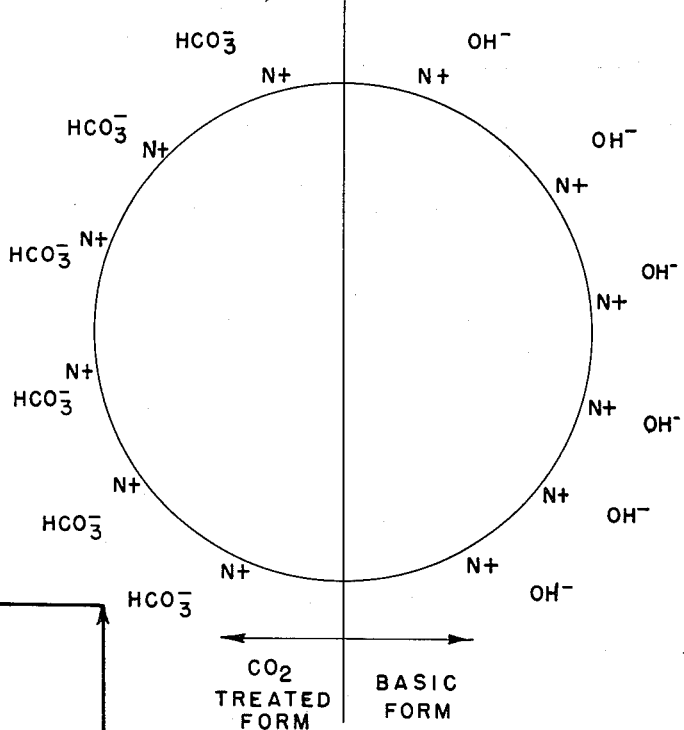

In the drawings Figure 1 is a flow-sheet of a typical process of the invention, and Figure 2 is a schematic illustration of an anion-exchanger particle used in processes of the invention.

According to the present invention anions are withdrawn from an aqueous alumina sol while maintaining a pH below 6 whereby precipitation of the sol is avoided. Processes heretofore suggested which use a cation-exchanger in basic form, such as hydroxyl or carbonate, effect precipitation of positively charged colloids because of the local concentration of hydroxyl ions on the surface of the ion exchange particles.

In processes of the present invention the anion-exchanger is used in bicarbonate form. The pH of the sol will at all times be maintained below 7 and preferably below 6.

Considering the process in somewhat greater detail and referring to Figure 1, an anion-exchanger in basic form is slurried in water. The pH will be above 7. The anion-exchanger will be described in greater detail hereinafter. Carbon dioxide is added to the slurry until the anion-exchanger is in the bicarbonate form. The pH of the exchanger will be below 7 and preferably below 6. Water is drained from the exchanger.

The cation-exchanger in bicarbonate form is then brought into contact with a solution containing an anion X. Such a solution may be an alumina sol containing, for example, chloride ions. The pH of the solution is maintained below 7 and preferably below 6.

In the mixture of the anion-exchanger and the solution containing the anion X, the pH will be below 7 and preferably below 6. The solution after removal of the anion by the anion-exchanger is separated from the resin. The resin can be regenerated, as will be hereinafter described. The solution containing carbon dioxide constitutes a product of the present invention. The carbon dioxide can be removed if desired by steam sparging, by heating, or by blowing with an inert gas.

Considering the process in somewhat greater detail it will be understood that the anion-exchanger used as a starting material may be any of the anion-exchangers known in the art. Suitable anion-exchangers are mentioned, for instance, in United States Patents 2,438,230 and 2,422,054. A description of anion-exchangers will be found in the May 1945 issue of Chemical Industries in an article entitled "Ion-Exchange" by Sidney Sussman and Albert P. Mindler at pages 789, et seq.

A further description of anion-exchangers may be found in Annual Review of Physical Chemistry, volume 2, 1951, published by Annual Reviews, Incorporated, in a section by G. E. Boyd, page 313 and following.

Particularly preferred are the strong-base type anion-exchangers containing quaternary ammonium groups. Such materials, which are commercially available, are "Amberlite IRA-400" and "Nalcit Sar."

The anion-exchanger, or anion resin, will first be converted to a basic form, that is a form which has a pH above 7. This is done conventionally by treating the exchanger with sodium hydroxide, sodium carbonate, or other strong alkalis. Such strongly basic resins cannot practically be used directly for removing anions from alumina sols, and from sols of other hydrous metals because free hydroxyl ions on the surface of the resin cause coagulation of the colloid, at least locally, on the resin surfaces. In Figure 2 the usual basic form of a resin is illustrated on the right hand side of the dividing center line by showing hydroxyl ions adjacent to the surface.

According to the processes of the invention a slurry of the anion-exchanger in water is treated with carbon dioxide. This can be done simply by bubbling carbon dioxide gas through the slurry or by stirring the slurry with solid carbon dioxide, or so-called Dry Ice. Alternatively the carbon dioxide can be introduced into the slurry and held under pressure in order to speed up the reaction. Again it will be evident that water containing dissolved carbon dioxide can be used, as by washing a bed of the exchanger.

The carbon dioxide converts the surface hydroxyl groups, as shown in Figure 2 on the right hand side, to bicarbonate ions as shown on the left hand side of the figure. In such a slurry the pH of the medium adjacent to the resin is less than about 7 and is preferably less than about 6.

It will be understood that in speaking of the resin as being in the bicarbonate form the surface groups will be bicarbonate ions and there will be an equilibrium with some carbon dioxide in the solution. To assure that the resin is in bicarbonate form one should accordingly use some excess of carbon dioxide. The excess may, of course, be as much as required to effect saturation of the water in the system. After preparation of the exchanger in bicarbonate form, water is drained from it and it is preferably used while still wet or after it has been wetted with water containing carbon dioxide.

The anion-exchanger in bicarbonate form preferably has a pH below 6 as has been noted and should not go much above 7. The pH of the exchanger when mentioned herein refers to that of an aqueous medium adjacent to the exchanger particles and is measured by allowing the exchanger to settle from a water slurry and then determining pH electrometrically by immersing electrodes in the settled resin bed, preferably using glass electrodes.

It will be understood that a basic form of anion-exchanger may be converted to the bicarbonate form by any of the various routes generally suggested above. The exchanger which has been treated with sodium hydroxide or sodium carbonate may be treated with carbon dioxide as above generally described to produce the bicarbonate form. Alternatively the chloride form of the resin may first be treated with sodium bicarbonate and the resulting basic exchanger may be treated with carbon dioxide as by washing with water saturated with $CO_2$. The anion-exchanger thus prepared will have a pH below 7 and preferably below 6.

Particularly preferred for treatment according to processes of the invention are the alumina sols. The alumina sols may be any of those of the prior art which contain anions which it is desired to remove. Such anions are often added for purposes of stabilization of the sols or are added in order to effect peptization of the corresponding metal hydroxide. After the sol has been peptized a considerable amount of the anion can be removed without gelling of the sol.

A sol of alumina may be prepared, for example, as shown in United States Patent 2,085,129. This patent, incidentally, shows sols of other suitable metals.

An especially preferred type of alumina sol is one in which the ultimate particles consist of crystalline boehmite as indicated by X-ray diffraction pattern.

The anions which may be abstracted from sols according to the present invention are such anions as chloride, nitrate, sulfate, perchlorate, iodide, and bromide. As noted above some of these may be present merely as impurities and others may be added as a stabilizing ion at some point in the preparation of a sol. In either event the desired amount may be removed following processes of the invention. It is to be noted that it will not ordinarily be desirable to withdraw all of the stabilizing anions. For example, one hundredth of one per cent of the stabilizing anion may be left in the sol based on the weight of the aluminum oxide left in the sol.

In operation of processes of the invention the cation-exchanger in bicarbonate form will ordinarily be drained as above described and added to the sol to be treated. The withdrawal of anion from the sol will be effected at pH below 7 and preferably below 6. It will be understood that there is no lower limit on the pH of the sol. The lowest pH will be the pH of the starting sol selected and this will gradually rise as the anion is withdrawn.

Instead of adding the drained resin to the sol it will be understood that the sol and resin may be added simultaneously to a receptacle or the sol may be passed through a body or layer of the exchanger.

After the anion has been abstracted from the sol to the desired extent the sol is separated from the exchanger. The exchanger is then regenerated as above described. Before regeneration it is, of course, desirable to wash from the resin any sol mechanically held and to return this wash water to the process.

The sol produced may be used as such. If desired, however, the carbon dioxide may be removed by heating the sol, by passing an inert gas such as air or nitrogen through the sol, or by steam sparging.

In order that the invention may be better understood reference should be had to the following illustrative examples.

*Example 1*

An aqueous sol consisting of particles of boehmite alumina was treated according to the invention. This aqueous sol contained 1.8 per cent alumina calculated as $Al_2O_3$ and 0.64 per cent chloride ion. In order to prepare the bicarbonate form of an anion-exchanger a quantity of a strongly basic modified amine exchange resin known commercially as "Amberlite IRA-400," in the hydroxy form, was slurried in water and solid carbon dioxide was added to maintain a saturated solution of $CO_2$ for 2 hours. The temperature of the water was near freezing during this period. The pH of the resin was 6.4. At the end of this time the resin was filtered and washed three times with water containing dissolved carbon dioxide.

Sixty-four and one half grams of the alumina sol as above described was diluted to 120 grams, filtered through paper and 100 grams of the resulting filtrate was transferred to a beaker. The sol was stirred continuously and 10 grams of the wet drained bicarbonate form of an anion-exchanger prepared as above described was added slowly and uniformly over a 5 minute period. Stirring was continued and after 5 more minutes the chloride concentration of the supernatant liquor was found to be 0.04 per cent. At the end of 25 minutes the chloride ion concentration of the supernatant liquid was found to be 0.022 per cent.

The resin was separated from the sol by filtration. No precipitated alumina was found on the resin and the sol was free from precipitate.

*Example 2*

A sol of boehmite alumina particles containing 2 per cent alumina as $Al_2O_3$ and 0.74 per cent chloride ion was used. 250 grams of the sol was treated in a manner similar to that in Example 1 with 53.7 grams of the wet drained bicarbonate form of the type of resin used in Example 1. The resin was added to the sol over a five minute period and the mixture was stirred by sparging with a stream of nitrogen gas. It was also stirred mechanically. The stirring and sparging continued for 25 minutes. The sol was filtered from the resin at a pH of 5.2. It was slightly turbid and viscous but no precipitation occurred. Since the pH of the starting sol was 3.0 most of the chloride ion was removed by the treatment. The product sol contained 1.63 per cent alumina and 0.028 per cent chloride. This sol contained a lower percentage of alumina than the starting sol because it was diluted by the water held on the bicarbonate form of the anion-exchanger used. No alumina, however, was precipitated on the resin.

We claim:

In a process for abstracting an anion from an aqueous alumina sol the steps comprising adjusting the pH of an anion-exchanger in basic form to below 7 by adding carbon dioxide thereto, adding said exchanger to said aqueous sol to abstract an anion therefrom and maintaining a pH below 6 while abstracting said anion, separating said exchanger from the aqueous system, and removing carbon dioxide from the aqueous system.

References Cited in the file of this patent

UNITED STATES PATENTS

| | | |
|---|---|---|
| 1,491,250 | Von Hoessle | Apr. 22, 1924 |
| 2,164,156 | Liebnecht | June 27, 1939 |
| 2,227,520 | Tiger | Jan. 7, 1941 |
| 2,240,116 | Holmes | Apr. 29, 1941 |
| 2,267,841 | Riley | Dec. 30, 1941 |
| 2,392,105 | Sussman | Jan. 1, 1946 |
| 2,404,367 | Durant et al. | July 23, 1946 |
| 2,438,230 | Ryznar | Mar. 23, 1948 |
| 2,590,833 | Bechtold et al. | Apr. 1, 1952 |